United States Patent [19]
Schwab et al.

[11] Patent Number: 6,060,030
[45] Date of Patent: May 9, 2000

[54] DETACHED PLUME ABATEMENT METHOD

[76] Inventors: James J. Schwab, 3539 Lowrey Ct., Napa, Calif. 94558; Ronald L. Hawks, 5928 Wintergreen Dr., Raleigh, N.C. 27609

[21] Appl. No.: 09/063,703

[22] Filed: Apr. 20, 1998

[51] Int. Cl.$^7$ ................................................. B01D 53/40
[52] U.S. Cl. ............... 423/210; 423/243.08; 423/240 R; 423/356; 423/DIG. 5; 106/762
[58] Field of Search ........................ 423/DIG. 5, 243.08, 423/210, 240 R, 356, 357; 106/762

[56] References Cited

U.S. PATENT DOCUMENTS

| | | | |
|---|---|---|---|
| 3,984,217 | 10/1976 | Huntington | 55/20 |
| 4,080,218 | 3/1978 | Mori et al. | 106/100 |
| 4,208,381 | 6/1980 | Isahaya et al. | 423/210 |
| 4,375,450 | 3/1983 | Katagiri et al. . | |
| 4,666,690 | 5/1987 | Sommerlad | 423/242 |
| 4,708,855 | 11/1987 | Morrison | 423/235 |
| 5,223,239 | 6/1993 | Moran et al. | 423/640 |
| 5,246,594 | 9/1993 | Stegemann et al. | 210/743 |
| 5,246,680 | 9/1993 | Pikkujamsa | 423/244.07 |
| 5,279,646 | 1/1994 | Schwab | 95/201 |
| 5,484,471 | 1/1996 | Schwab | 95/8 |
| 5,759,233 | 6/1998 | Schwab | 95/8 |

FOREIGN PATENT DOCUMENTS

| | | | |
|---|---|---|---|
| 56-129.030 | 10/1981 | Japan | 423/240 R |

OTHER PUBLICATIONS

Kohl et al. *Gas Purification* 4th Edition, Gulf Pub. Co. Houston TX USA; ISBN 0–87201–314–6; pp. 249, 306, 307, and 388–396, 1985.

Hawks, et al., "A Proactive Approach to Minimizing Opacity from Cement Kilns," 1995 IEEE Cement Industry Technical Conference, pp. 451–463, Jun. 4–9, 1995.

Lewis, "Lime In Stack Gas Scrubbing: Some Field Observations" National Lime Association Conference Proceedings, pp. 157–166, Sep. 27–28, 1983, Denver Colorado.

Tassicker, et al., "High–Intensity Ionizer for Improved ESP Performance," *EPRI Journal*, pp. 56–61, Jun./Jul. 1997.

J. T. McKennon, "The Porta Batch Lime Slurry Method," *Innovations and Uses for Lime*, ASTM STP 1135., pp. 32–40, Philadelphia, 1992.

F. Schwarzkopf, et al. "High Surface Area Hydrate WUEL-FRAsorp—Commercial Production and Application," *Innovations and Uses for Lime*, ASTM STP 1135., pp. 96–111, Philadelphia, 1992.

G. Werner, et al., "Electrostatic precipitators in cement plants," *International Cement Review*, pp. 61–65, Aug. 1991.

L. Bier, et al., "Construction and operation of a hydrated lime plant for flue gas desulphurization of the Siersdorf power station," Zement–Kalk–Gips, pp. 207–209, Wiesbaden, No. 8, 1992.

Robert H. Perry, et al., Chemical Engineers HandBook, 5$^{th}$ Edition, pp.8:51–52, 8:13, and 21:41, 1973.

S. H. Sheth, "$SO_2$ Emissions History and Scrubbing System," Presentation at 33$^{rd}$ IEEE Cement Industry Conference, pp 191–228, Mexico City, May, 1991.

Riley, et al., "Re–evaluating evaporative gas conditioning: Is feasibility still an issue?", *International Cement Review*, pp. 36–40, Nov. 1990.

N. Biege, et al., "A Changing Environment," *International Cement Review*, pp. 73–80, Jul. 1997.

L. Edwards, et al., "Simultaneous In–Plume and In–Stack Sampling for Analysis of A Detached Plume at A Cement Plant," pp. 1–6, *Journal of Atmospheric Sciences*, 1991.

P. V. Bush, "Advantages of Humidification for Pollution Control," American Power Conference, Library of Congress Cat. Crd. No. 39–5827, vol. 57–1, pp. 38–43, 1995.

"VenturiPak Gas Scrubbing Systems for Wastewater Applications," EnviroCare Systems, Inc., Novato, California, Product Information Brochure, Feb., 1998.

"MicroMist Evaporative Gas Cooling and Conditioning Systems," EnviroCare International, Novato, California, Product Information Brochure, Jul., 1993.

"MicroMist Engineered Systems, Enhancing Dust Collector Performance," EnviroCare International, Novato, California, Product Information Brochure, Nov., 1996.

*Primary Examiner*—Steven P. Griffin
*Assistant Examiner*—Timothy C. Vanoy
*Attorney, Agent, or Firm*—Coudert Brothers

[57] ABSTRACT

A method is provided for abating acidic contaminants, such as sulfur dioxide and hydrogen chloride, in exhaust gases while minimizing the formation of visible plumes of ammonium salts proximate to the outlet of the exhaust stack by injecting a spray of an alkaline liquid, such as sodium hydroxide or potassium hydroxide, into the contaminated exhaust gases wherein the pH of the alkaline liquid is high enough, i.e. greater than a pH of about 11, so that the acidic contaminants preferentially react with the alkaline liquid rather than the ammonia in the gases, thereby minimizing formation of visible plumes of ammonium salts.

18 Claims, 5 Drawing Sheets

DETACHED PLUME ABATEMENT METHOD

FIELD OF THE INVENTION

This invention relates generally to the field of air pollution control and abatement systems. More particularly, the present invention is directed to a method of abating visible condensed plumes of ammonia particles which sometimes form in the atmosphere above a stack.

BACKGROUND OF THE INVENTION

Over the past several decades the control of air pollution has become a priority concern of society. The United States and other countries have developed elaborate regulatory programs aimed at requiring factories and other major sources of air pollution to install the best available control technology (BACT) for removing contaminants from gaseous effluent streams released into the atmosphere. The standards for air pollution control are becoming increasingly stringent, so that there is a constant demand for ever more effective pollution control technologies. In addition, the operating costs of running pollution control equipment can be substantial, so there is also a constant demand for more efficient technologies.

Air pollution control regulations include regulations for the optical opacity of the effluent gases (see, e.g., "A Changing Environment," Neil Biege, Hank Pretti, and Walt Pirwitz, International Cement Review, p. 73, July 1997). The opacity is often measured in the stack by measuring the obscuration of a light beam passing through the gases. However, most air pollution control regulations define opacity in terms of the visibility of the plume after the water vapor (steam) has condensed out of the plume. One air pollution control problem is the formation of what is commonly described as a "detached plume." The term "detached plume" is commonly used by those skilled in the art to describe an opaque plume that forms or intensifies after leaving the stack and that remains highly visible even after all of the steam has dissipated from the stack emissions. Detached plumes are a particularly intractable problem for cement plants, but are also sometimes associated with other facilities. In many cases, a detached plume is a visible plume that is physically detached from the stack, forming about 10 meters or more from the exit of the stack. However, while the term "detached plume" is physically descriptive of what was observed by many U.S. researchers, this phenomena is also known by other terms. For example, in cold, humid weather conditions, such as those often experienced in Canada, these opaque plumes may appear to originate inside the stacks. These opaque plumes are also known as "secondary plumes," "blue haze," or "reactive plumes," particularly in cold, humid climates such as Canada. However, in these cases the physical phenomena creating the opaque plume is believed to originate from similar chemical mechanisms. Where such a detached plume appears to be "attached" to the stack, its intensity increases a distance from the stack exit. Each of these attached plumes will also be referred to as a "detached" plume.

A detached plume for a cement plant is typically intermittent in nature but once formed a detached plume condition may last for hours or days. Such plumes are highly noticeable. The formation of a visible plume may constitute a regulatory violation and is likely to cause concern from community members near the cement plant. Specifically, detached plumes may violate pollution control regulations for opacity, and are thus a potentially serious problem.

Experimental studies and analysis have identified the detached plumes as being comprised primarily of ammonium sulfate and ammonium chloride particulates that form and condense as emissions from the stack cool in the atmosphere (see, e.g., Larry Edwards and Lee W. Cover, "Simultaneous In-Plume and In-Stack Sampling For Analysis of Detached Plume At A Cement Plant"). The ammonium particulates are in a size range of approximately one micron, which is a size that is particularly efficient at scattering and reflecting light. In cement manufacture, the ammonia in the particulates is generally believed to come from the feed meal used in the cement process itself Modern cement plants typically use either electrostatic precipitators (ESPs) or fabric filter baghouse (FFB) collectors to remove particulates from the exhaust gas before it is released to the atmosphere. ESPs are capable of high particle collection efficiency of fine particles when the particles have the proper electrical resistivity. FFBs are capable of high particle collection efficiency of fine particles when the particles have the proper characteristics. Typically, pollutant gases are first conditioned such that the particulates can be more efficiently collected by ESPs or FFBs. Typically, the hot cement kiln gases must be cooled to approximately 150° C. to have acceptable emissions from an ESP or cooled to approximately 180° C. to protect a FFB from overheating. Modern energy efficient cement plants typically use two methods to cool and condition hot gases before they enter an ESP or FFB. In a first stage of cooling, a gas conditioning tower (GCT) uses a spray of water to cool and condition the hot gases.

Many modern energy efficient cement plants also perform a second stage of cooling and conditioning subsequent to the GCT by passing the hot cement kiln/preheater gases through the cool wet limestone of the raw feed mill supplying fresh meal to the kiln. This has the beneficial effects of drying the meal and reducing the quantity of cooling water that must be sprayed in the GCT, thereby reducing energy and water consumption in the plant. When the feed mill is on, the gas conditioning tower typically must only cool the effluent to around 250° C., with the remaining cooling of the gases (to approximately 150° C.) occurring in the feed mill. When the feed mill is shut off, the cooling tower must provide all of the cooling, which means that more cooling must occur in the cooling tower. There are thus two distinct operational states of the cement kiln off-gas equipment, corresponding to mill-on and mill-off conditions.

Detached plume formation has been observed to be highly dependent upon the operational state of the cement plant. The formation of detached plumes occurs more frequently (and is typically more prominent) when the raw feed mill is shut off. Since detached plume formation is more frequent in the mill-off state, the inventors believe that the concentration of plume-forming gases in the stacks is substantially higher for the mill-off state.

The pollution control means typically used in modern cement plants is inadequate to remove the chemical constitutes that form detached plumes. Conventional air pollution control techniques previously used for cement plants, such as ESPs and FFBs, do not capture the chemical emissions that are believed to cause the formation of detached plumes.

There are many technical obstacles to eliminating detached plumes from the stacks of cement plants. It is generally known that the release of ammonia is a factor in the formation of detached plumes. However, ESPs and FFBs do not remove gaseous chemicals such as ammonia. In principal, additional chemical scrubbing means could be added subsequent to the particle removal stage to remove the ammonia gases. However, a conventional chemical gas scrubber attached subsequent to an ESP or FFB which could handle the large gas effluent load of a cement plant would be prohibitively expensive and consume large quantities of energy and large volumes of chemicals. Additionally, it may be possible to abate detached plumes by reducing the concentration of ammonia and other plume-forming gases in the source materials such that the concentration of ammonia in stack emissions is substantially reduced. However, the reduction or elimination of potential gas phase reaction components from raw materials (e.g., ammonia, chlorides, and sulfur in raw feed meal), has been largely unsuccessful because of the practical problems associated with substantially reducing the concentration of ammonia and other plume-forming chemicals from source materials. (See, e.g., Ronald L. Hawkes and Thomas Rose, "A Proactive Approach to Minimizing Opacity From Cement Kilns," 1995 IEEE Cement Industry Technical Conference, Institute of Electrical Engineers, Inc. (1995), pp. 451 et seq.).

No known conventional pollution control provides an economical, efficient, and reliable method to remove the gases which may create detached plumes. No known conventional pollution control system for cement plants efficiently prevents the formation of detached plumes.

What is desired is a practical method to prevent the formation of detached plumes.

SUMMARY OF THE INVENTION

The present invention generally comprises a method for the efficient, selective scrubbing of acidic-forming gases using an alkaline spray with a pH greater than 11 and spray droplets with an initial mean diameter less than about 200 microns. In the present invention, the spray droplets have a high surface-to-volume ratio which increases the rate at which acidic-forming gases are absorbed by spray droplets. The high pH of the spray also facilitates the rapid conversion of acidic-forming gases into thermally stable salts and substantially limits the absorption of ammonia in spray droplets.

One aspect of the present invention comprises a method of using an alkaline spray in a gas cooling tower to continuously reduce the concentration of acidic-forming gases, such as sulfur dioxide, sulfur trioxide, and hydrogen chloride that may contribute to the formation of a detached plume. A further aspect of the present invention comprises a method of preventing the formation of a recirculating load of ammonia in the feed meal of a cement plant by using an alkaline spray to facilitate the purging of ammonia from the cement plant. Yet another aspect of the present invention comprises a method to reduce the probability that a detached plume will form by increasing the pH of an alkaline spray used in a gas cooling tower for operational conditions that are associated with a high probability of a detached plume forming. Another aspect of the present invention comprises a method to suppress further growth of detached plumes by increasing the pH of the alkaline spray once a detached plume is detected.

DETAILED DESCRIPTION OF THE INVENTION

The formation of detached plumes is an important pollution control problem for modern cement plants that use electrostatic precipitators (ESPs) or fabric filter baghouse (FFB) particle collectors to satisfy air pollution control regulations for particle emissions. However, the phenomena of detached plumes comprised of ammonia particulates is not limited to cement plants. There are other applications in which ammonia may be released into the atmosphere to form detached plumes. For example, it is believed that waste energy plants, such as those used to convert agricultural wastes into energy, have an analogous detached plume problem because ammonia is used in many waste energy plants to control nitrogen oxide emissions.

The present invention is illustrated with reference to the particular problems of a modern cement plant using an ESP particle collector to demonstrate the usefulness of the invention. However, the teachings of the present invention are equally applicable to cement plants using FFB collectors. The teachings of the present invention are also generally applicable to other pollution control systems, such as waste energy plants, in which a detached plume comprised of ammonia particulates forms in the atmosphere as a consequence of ammonia or ammonia compounds released from stack emissions.

Figure 1:
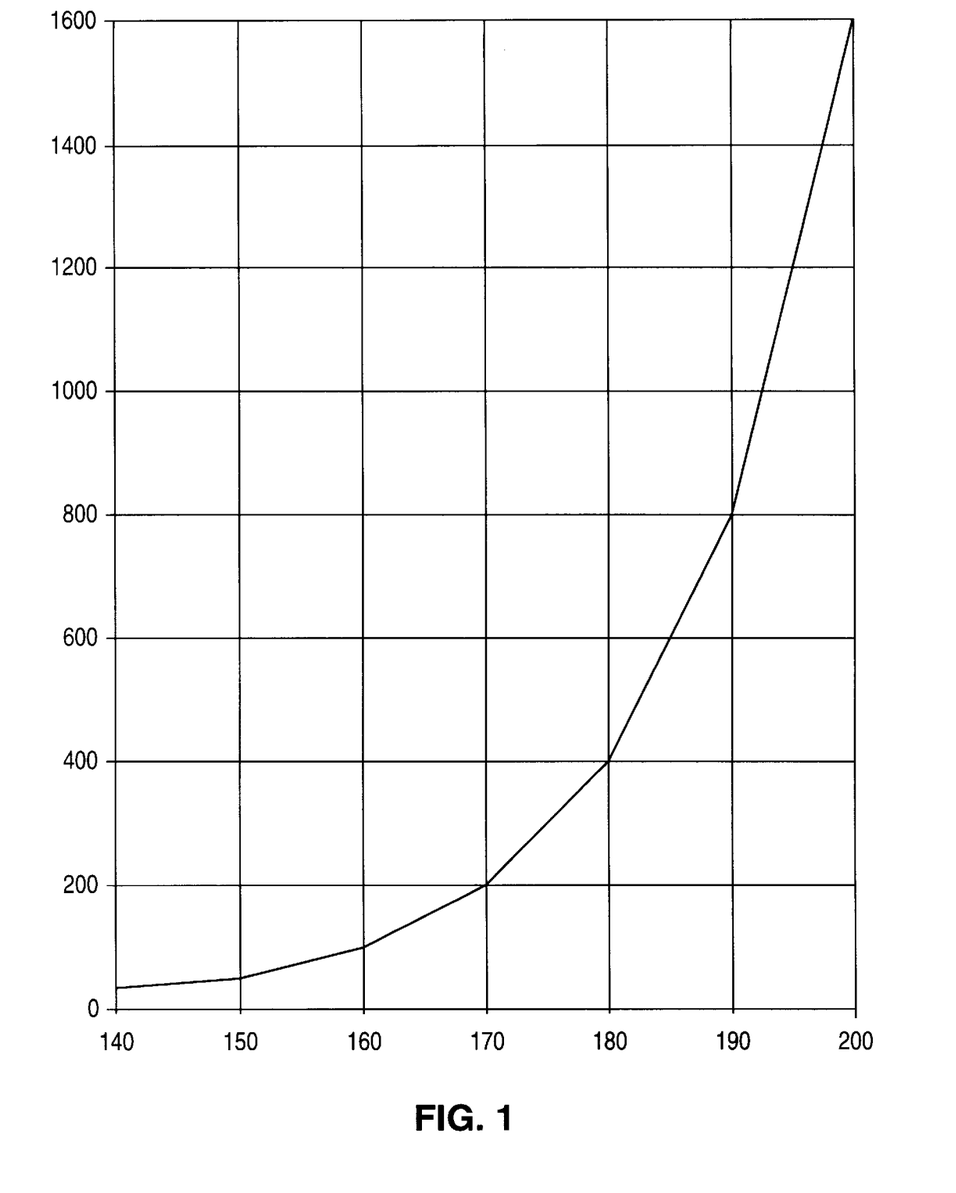
FIG. 1 is a graph showing the relationship between particulate emissions and gas temperature in an electrostatic precipitator used in a modern cement plant.

ESPs are commonly used in modern cement plants to control particle emissions. ESPs are generally recognized as being capable of high particle collection efficiency, especially of fine particles when the particles have the proper electrical resistivity (see, e.g., Tassicker and Schwab, "High Intensity Ionizer For Improved ESP Performance, pp. 56–58, EPRI Journal (June/July 1977). The optimum range of particle resistivity in situ is typically between $10^9$ and $10^{11}$ ohm cm. In many industrial applications, the suspended dust particles in the effluent gas streams are not in this range for the gas conditions entering the ESP. Therefore, the dust particles must be conditioned prior to entry into the ESP by changing the gas temperature or increasing the moisture content of the gases or both (see, e.g., G. Werner, "Electrostatic Precipitators In Cement Plants", International Cement Review (August 1991) pp. 61 et seq.; and J. R. Riley and John M. Tate, "Re-evaluating Evaporative Gas Conditioning: Is Feasibility Still An Issue?" International Cement Review (November 1990), pp. 36, et seq.). FIG. 1 is a graph of particulate emissions ($mg/Nm^3$) from a cement kiln/preheater tower versus gas temperature (°C.) at the ESP when the gases are conditioned by the evaporative cooling of water. As can be seen in FIG. 1, hot cement kiln/preheater tower gases ($\approx 400°$ C.) must be cooled to around 150° C. to have acceptable particle emissions of <50 $mg/Nm^3$ from an ESP.

Figure 2:
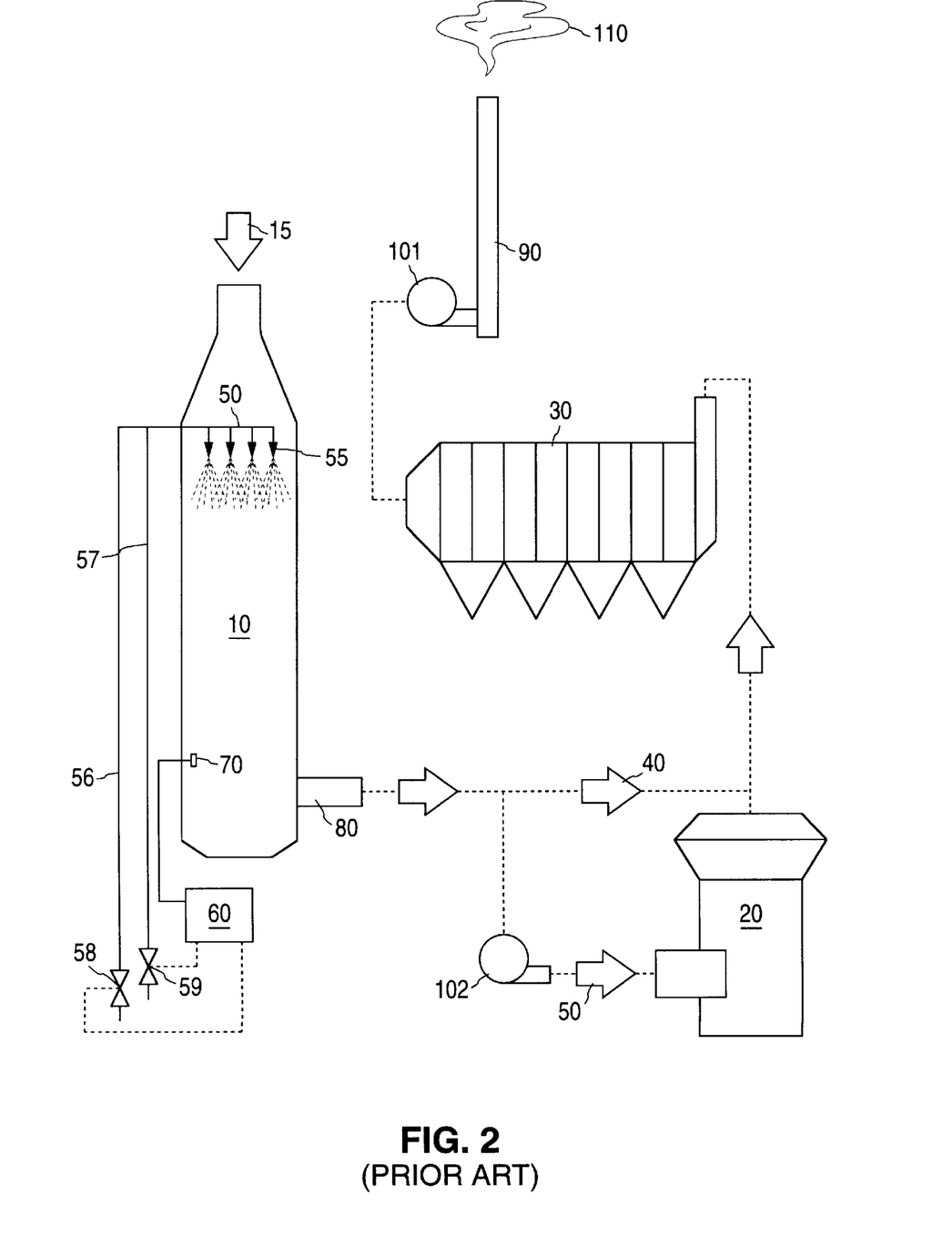
FIG. 2 is a process flow diagram of a typical modern cement plant showing the air pollution control equipment and raw feed mill.

The theoretical and practical problems of detached plume formation in a modern cement plant can be illustrated with reference to the pollution control system of FIG. 2. As shown in FIG. 2, in a modern pollution control system for a cement plant, hot gases from a preheater tower (not shown) enter a gas conditioning tower (GCT) 10. (The gas flow entering GCT 10 is shown schematically by flow arrow 15.) Gases entering the GCT may be as hot as 400° C. Nozzle means 50 located within GCT 10, near the entrance thereto, injects a spray of cooling liquid into the hot gas flow in the tower. As depicted, nozzle means 50 preferably comprises a plurality of individual nozzles 55, in order to ensure that the injected spray is evenly distributed into the gas flow, thereby promoting uniform cooling. Preferably, individual nozzles 55 are two-fluid nozzles connected by supply pipes 56 and 57 to a source of cooling liquid (e.g., water) and compressed air, respectively. The flow of water and air to the nozzles is modulated by valves 58 and 59, respectively. Valves 58 and 59 are controlled by logic and control system 60 to maintain a spray of desired characteristics. Logic and control system 60 preferably is also used to monitor various system parameters and to adjust the spray as conditions change. As is known in the prior art, for example, a temperature sensor 70 may be placed near the exit of GCT 10 to monitor the temperature of the gas flow leaving the GCT. Logic and control system 60 uses the information from the temperature sensor 70 to determine whether the temperature leaving GCT 10 is within a desired target range. If the temperature is outside of the target range, logical control system 60 responds by adjusting the spray accordingly. Other sensors may also be employed and connected to the logic and control system, such as sensors (not shown in FIG. 1) for measuring the temperature of gases flowing into GCT 10.

Gases exit GCT 10 via outlet 80 and preferably flow into a raw feed mill 20 to help dry and preheat the wet limestone used in the cement plant, and then on to electrostatic precipitator (ESP) 30. However, during a raw-mill upset or when the raw feed mill is not in operation, gases flow directly from GCT 10 to ESP 30 as shown by flow arrow 40. After leaving ESP 30, the gases are exhausted into the atmosphere via stack 90. The gases may be propelled through the air pollution control system using fans 101 and 102.

The spray characteristics of the two-fluid nozzles 55 can be altered by adjusting the pressure of compressed air and water supplied to the nozzle. In particular, both the quantity of water and the mean size of the water droplets exiting the nozzle may be controlled. A two-fluid nozzle such as the MICROMIST™ nozzle manufactured by Envirocare International, Inc. is an example of a two-fluid nozzle whose spray characteristics can be adjusted. Typically, the droplet size is adjusted such that the droplets totally evaporate before they exit the GCT, while the quantity of water is adjusted to achieve the desired gas output temperature (e.g., 250° C. for mill-on and 150° C. for mill-off conditions).

Under normal operating conditions, the gases in the system are directed to raw feed mill 20; (this condition will be referred to as the "mill-on" condition). The feed stock in feed mill 20 is cool and wet, and presents a relatively large surface area to the hot gases entering the feed mill. Thus, as hot gases from GCT 10 pass through the feed mill they are further cooled and moisturized. This also has the desirable energy-saving effect of helping to dry and pre-heat the meal before it enters the kiln.

While the pollution control system of FIG. 2 is an example of a modern pollution control system that is effective at removing common particulates, it does not address the problem of preventing the formation of detached plumes. As shown schematically in FIG. 2, even though the stack emissions of a state-of-the art cement plant may meet other pollution control regulations, a detached plume 110 of particles may still develop 10 meters or more from the stack.

The inventors have conducted their own experimental studies and analysis and have developed a model for the formation of a detached plume in a modern cement plant with a pollution control system such as depicted in FIG. 2. During ordinary cement plant operations, the concentration of ammonia, sulfur dioxide, ammonium chloride gas, and hydrochloric acid in stack emissions is comparatively low and a prominent detached plume is only intermittently observed.

The inventors believe that a detached plume consisting primarily of ammonium sulfate particles is produced in the atmosphere by a series of reactions as the emitted gases cool and are absorbed on condensed water droplets. The formation of ammonium sulfate particulates depends upon the availability of condensed water vapor, sulfur dioxide gas, and ammonia gas proximate to the stack. Sulfur dioxide gas may be absorbed into condensed water droplets. The absorption of sulfur dioxide on condensed water droplets decreases the pH of the droplet, which increases the rate ammonia is absorbed by the droplet. As ammonia gas is absorbed in the droplet, ammonium hydroxide is produced in the droplet. This reaction can be summarized as: $NH_3(g)+H_2O(l) \rightarrow NH_4OH$ (aq).

As more ammonia is absorbed in a droplet, the pH of the droplet becomes alkaline, and the sulfurous acid in the droplet is oxidized to sulfuric acid. This series of reactions can be summarized as:

$H_2O(g) \rightarrow H_2O(l)$ $SO_2(g)+H_2O(l) \rightarrow H_2SO_3(aq)$

The sic acid in the droplet reacts with the dissolved ammonia to form ammonium sulfate, which is expressed by the equation: $H_2SO_4(aq)+NH_4OH(aq) \rightarrow (NH_4)_2SO_4(s)$. The rate at which this reaction occurs is controlled by the concentration of sulfur dioxide in the plume, the water vapor content of the plume, and the concentration of ammonia in the stack gases. Fine ammonium sulfate particles remain in the plume after water evaporates from the droplets. Detached plumes may form if environmental conditions (e.g., temperature, wind, and humidity) favor rapid absorption of source chemicals in water droplets of the steam plume near the stacks.

The inventors also believe that ammonium chloride particulates are formed in the atmosphere primarily as a result of the solidification of gaseous ammonium chloride from the stack. As discussed below, it is believed that ammonium chloride is created by the reaction of ammonia and hydrogen chloride in spray droplets in the GCT and released as gaseous ammonium chloride as the spray droplets evaporate in the GCT. Ammonium chloride can exist in gaseous forms at temperatures between 130° C. to 340° C. The inventors believe that solid ammonium chloride in the atmosphere forms when ammonium chloride gas emitted from the stack solidifies in the atmosphere once its temperature drops to less than 130° C. This is expressed by the equation: $NH^4Cl(g) \xrightarrow{<130°C} NH_4Cl(s)$. This reaction does not require water vapor to condense near the stacks, so it is less dependent upon weather conditions compared with the reactions that form ammonium sulfate.

Figure 3:
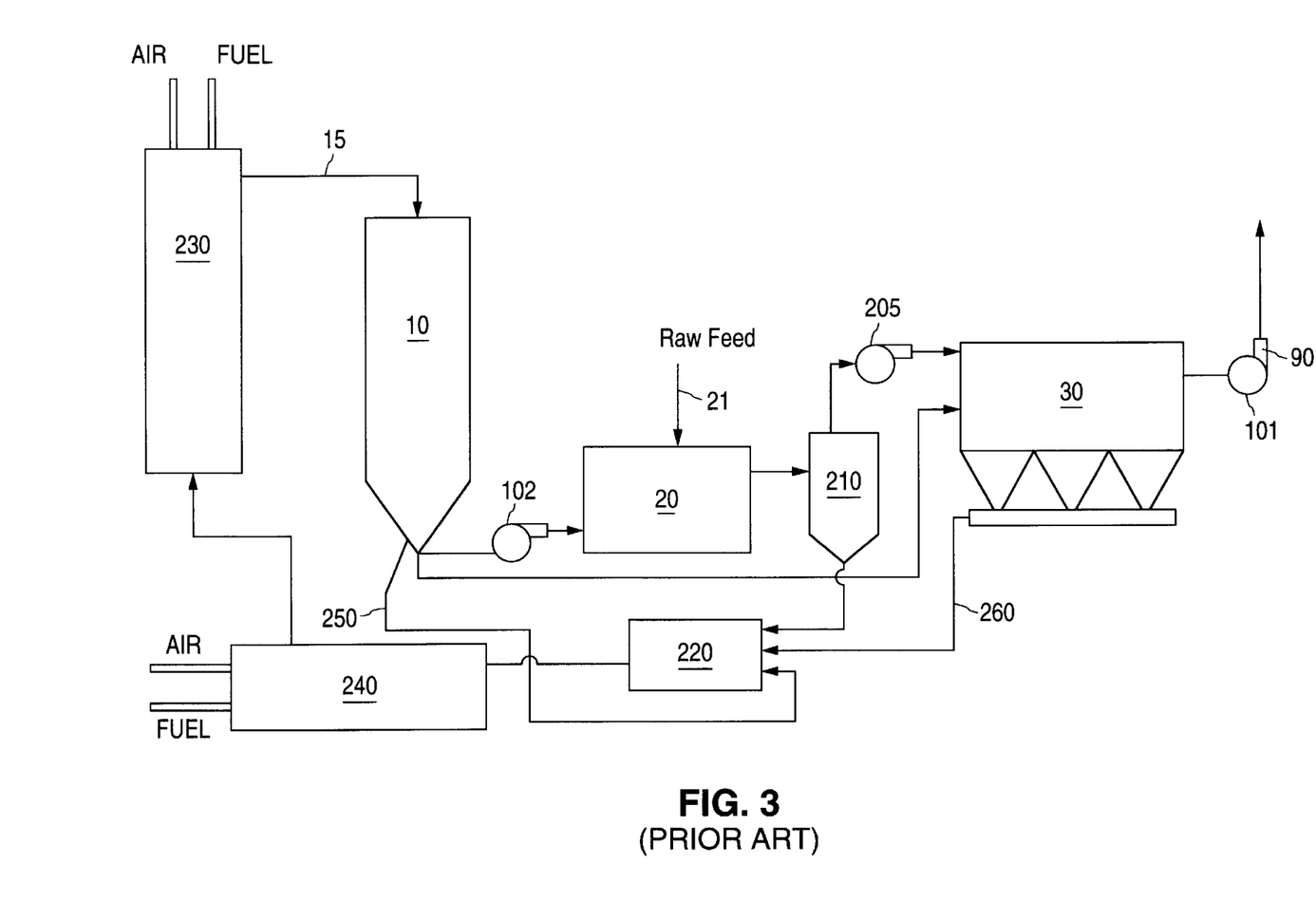
FIG. 3 is a process flow diagram of a typical modern cement plant showing the off-gas system including pollution control equipment, the kiln, preheater tower, and homogenizing silo.

The inventors' have also developed a model that explains the cause of more prominent plume formation in the mill-off state. The inventors' model indicates that there is a mechanism for the build-up of ammonium compounds in the cement plant when the mill is in the mill-on state such that increased quantities of ammonia are released in the mill-off state. FIG. 3 is a process flow diagram of the pollution control system of FIG. 2 which also shows the flow of gases and meal. Referring to FIG. 3, in the mill-on state raw feed meal enters the mill 20 as is shown by arrow 21 and is ground in mill 20. The ground meal enters a cyclone 210, which separates the ground meal from the gas stream. The ground meal is stored in a homogenizing storage silo 220. Also, as shown, a second fan 205 may assist in the flow of effluent gases through the cyclone 210. The storage silo 220 permits a continuous supply of ground (kiln) meal to be fed to the preheater tower 230 of a cement kiln 240 even when the mill 20 is in the mill-off state. Also, as shown in FIG. 3, modern cement plants may also have drop-out means 250 by which solid materials collected at the base of GCT 10 may be recycled into the kiln feed of storage silo 220. Also, collected particulates from ESP 30 are primarily collected into the kiln feed of storage silo 220 by means of a drop-out 260. As previously observed, the raw feed of a cement plant naturally contains some ammonia compounds, such that a small concentration of ammonia can be expected in the emissions of a cement plant. However, the inventors' model indicates that in the mill-on state the ground feed meal can accumulate additional ammonia from the effluent gases 50 passing through the raw meal of mill 20. This increases the concentration of ammonia compounds in the ground kiln meal of the storage silo 220 which enters the preheater 230 of kiln 240. The inventors believe that the concentration of ammonia compounds of meal entering the preheater 230 may be substantially elevated compared with the raw meal entering mill 20.

According to the inventors' model, the process that leads to a high concentration of ammonia in a cement plant begins with the pollutant gas flow 15 from the preheater. Feed meal is heated in the kiln 240 or preheater tower 230 to a temperature well above 400° C. This temperature is above the decomposition temperature of ammonium sulfate and ammonium chloride that are present in the meal. The heating of the meal releases ammonia, sulfur dioxide, sulfur trioxide and hydrogen chloride, which along with nitrous oxide, nitrogen dioxide, and other gases become part of the effluent gas flow 15 entering the GCT 10. The decomposition reaction for ammonium sulfate in the kiln is: $(NH_4)_2SO_4 (S) \xrightarrow{>235°\ C} 2NH_3(g)+H_2O(g)+SO_3(g)$. The decomposition reactions for ammonium chloride in the kiln are:

Thus, ammonia, hydrogen chloride, and sulfur trioxide are produced from the decomposition of ammonium chloride and ammonium sulfate in the meal and become part of gas flow 15 entering the GCT 10.

Gases entering GCT 10 from the preheater may be both adsorbed and desorbed by the spray from the nozzle means 55. In the adsorption phase, chemical gases entering the GCT 10 are adsorbed by spray droplets from the nozzles 55. In the GCT 10, acidic gases, such as sulfur dioxide, sulfur trioxide, nitrogen oxide, nitrogen dioxide, and hydrogen chloride are absorbed in water droplets emitted from the nozzles 55 to form sulfuric acid, sulfurous acid, nitrous acid, and hydrochloric acid. For example, sulfur trioxide may form sulfuric acid according to the reaction: $SO_3(g)+H_2O(aq) \rightarrow H_2SO_4(aq)$. Sulfurous acid may be formed from the reaction of sulfur dioxide and water according to the reaction: $SO_2(g)+H_2O(l) \rightarrow H_2SO_3(aq)$. Aqueous hydrochloric acid may be produced by the reaction of gaseous hydrogen chloride with water according to the reaction: $HCl(g)+H_2O(aq) \rightarrow HCl(aq)+H_2O(aq)$. Other secondary reactions also may occur. For example, nitrous acid may be oxidized by the reaction with sulfuric acid. This reaction is expressed by: $H_2O(aq)+H_2SO_4+NO(aq) \xrightarrow{pH<4} H_2NO_3(aq)+H_2SO_3(aq)$.

As the droplets evaporate in the GCT there is also a desorption phase. When the droplets evaporate in the GCT 10 they typically release sulfur dioxide, hydrogen chloride, nitrogen dioxide, and other chemicals proximate to outlet 80. For example, aqueous sulfurous acid is converted into gaseous water and gaseous sulfur dioxide; aqueous hydrogen chloride is converted into gaseous hydrogen chloride; aqueous sulfuric acid is converted into gas phase sulfuric acid; and aqueous nitric acid is converted into nitrogen dioxide.

In the mill-on state, the gases exiting the GCT 10 from outlet 80 enter the raw feed mill 20. It is believed that one physical mechanism for the build-up of ammonia in the cement plant in the mill-on state is that sulfur dioxide gas produces sulfuric acid on the wet feed meal. Ammonia gas can then react with this sulfuric acid to produce ammonium sulfate. It is believed that as the raw meal is ground, the intense pressure on the meal produces condensation of water in the voids contained in the meal. Sulfur dioxide gas may be absorbed in this water, forming sulfurous acid. Ammonia gas is also absorbed by the water on the ground meal, which increases the pH of the solution. Additional hydrated calcium oxide from the recirculating dust may further increase the pH of condensed water. In such an alkaline solution, sulfurous acid is oxidized to become sulfuric acid, which then reacts with ammonia and forms ammonium sulfate. When the pressure is released on the meal, the water flash evaporates, leaving behind condensed ammonium salts on the surface of the ground meal. Additionally, gas phase sulfuric acid reacts with ammonia gas forming ammonium sulfate, which may condense and enter the meal. Since the meal temperature is below the decomposition temperature of ammonium sulfate, the ammonium sulfate salts will remain with the meal and enter the kiln. The raw feed, as it is processed by the kiln, releases ammonia and sulfur trioxide back into the pollutant gas flow 15 that enters the GCT 10.

Over the course of the days or weeks that feed mill 20 is in continuous operation, a large load of recirculating ammonia, sulfur dioxide, and sulfur trioxide may build-up in the ground kiln meal, even though the concentration of ammonia in the stack gases does not substantially increase. The inventors describe this phenomena as an "increasing circulating load." The concentration of ammonium sulfate that can accumulate in the kiln feed stored in silo 220 is believed to be a function of the concentration of the ammonia in the raw materials, the weight of recirculating dust from the preheater and its concentration of calcium oxide, the concentration of sulfur dioxide and sulfur trioxide at the preheater exit, the concentration of nitrous oxide in the preheater gases, and the elapsed time between feed mill shut downs. The recirculating load may eventually reach a saturation limit if the recirculating load of ammonia exceeds the ability of the mill grinding process to convert ammonia and sulfur dioxide to ammonium sulfate. If this occurs, the concentration of ammonia and sulfur dioxide emissions from the stacks will substantially increase.

The inventors also believe that there is a second mechanism for the build-up of ammonia compounds in a cement plant. As previously discussed, ammonium chloride can exist in gaseous forms at temperatures between 130° C. to 340° C. Gaseous ammonium chloride may form proximate to outlet 80 of GCT 10 from the reaction of ammonia and hydrogen chloride gas. The gaseous ammonium chloride will form solid particulates once it cools to less than 130° C. subsequent to outlet 80 of GCT 10. These solid ammonium chloride particles may be condensed onto raw feed meal of feed mill 20. Thus, in some cases an increasing recirculating load of ammonium chloride may also occur.

The inventors believe that ammonium chloride and ammonium sulfate are the two primary means by which a large recirculating load of ammonia is formed in a cement plant. However, there may be other secondary mechanisms as well. For example, the inventors believe that in some situations calcium sulfite or calcium bisulfite may also contribute to the recirculating load. Thus, the inventor's model for the development of a recirculating load is not intended to be exclusive of other secondary mechanisms which may contribute to the build-up of a recirculating load.

The inventors' model explains why detached plumes are more prominent for the mill-off state. In the mill-on state the pollutant gas is passed through the raw meal, which absorbs ammonia and acid gases, thus reducing their concentrations in the stack emissions. However, in the mill-off state, the pollutant gas is not passed through the meal. Consequently, in the mill-off state, the recirculating load of ammonia and sulfur-oxides exits the stacks as the ammonia and sulfur dioxide stored in the meal is released. The increased concentration of emitted ammonia, sulfur dioxide, and other plume-forming gases in the mill-off state will in turn increase the probability of detached plume formation.

As previously discussed, the formation of detached plumes in the atmosphere is highly dependent upon the concentrations of ammonia, sulfur dioxide, and ammonium chloride gases released into the atmosphere. In accordance with the foregoing analysis, the inventors have determined that one approach to the abatement of detached plumes is to reduce the recirculating loads in order to prevent the release of increased concentrations of ammonia, sulfur dioxide, and ammonium chloride during the mill-off state. Additionally, the formation of detached plumes in the mill-on state will be suppressed if the concentration of chemicals essential for the formation of ammonium sulfate and ammonium chloride in the atmosphere, such as sulfur dioxide, sulfuric acid, and hydrogen chloride, are reduced in the pollution control system.

According to the present invention, the formation of large recirculating loads of ammonium sulfate can be suppressed if the concentrations of sulfur dioxide and sulfur trioxide gases entering the feed mill 20 are substantially reduced. Additionally, the concentration of ammonium chloride in the feed meal can be suppressed if the concentration of gaseous hydrogen chloride leaving the GCT 10 is substantially reduced such that less solid ammonium chloride is formed.

Figure 4:
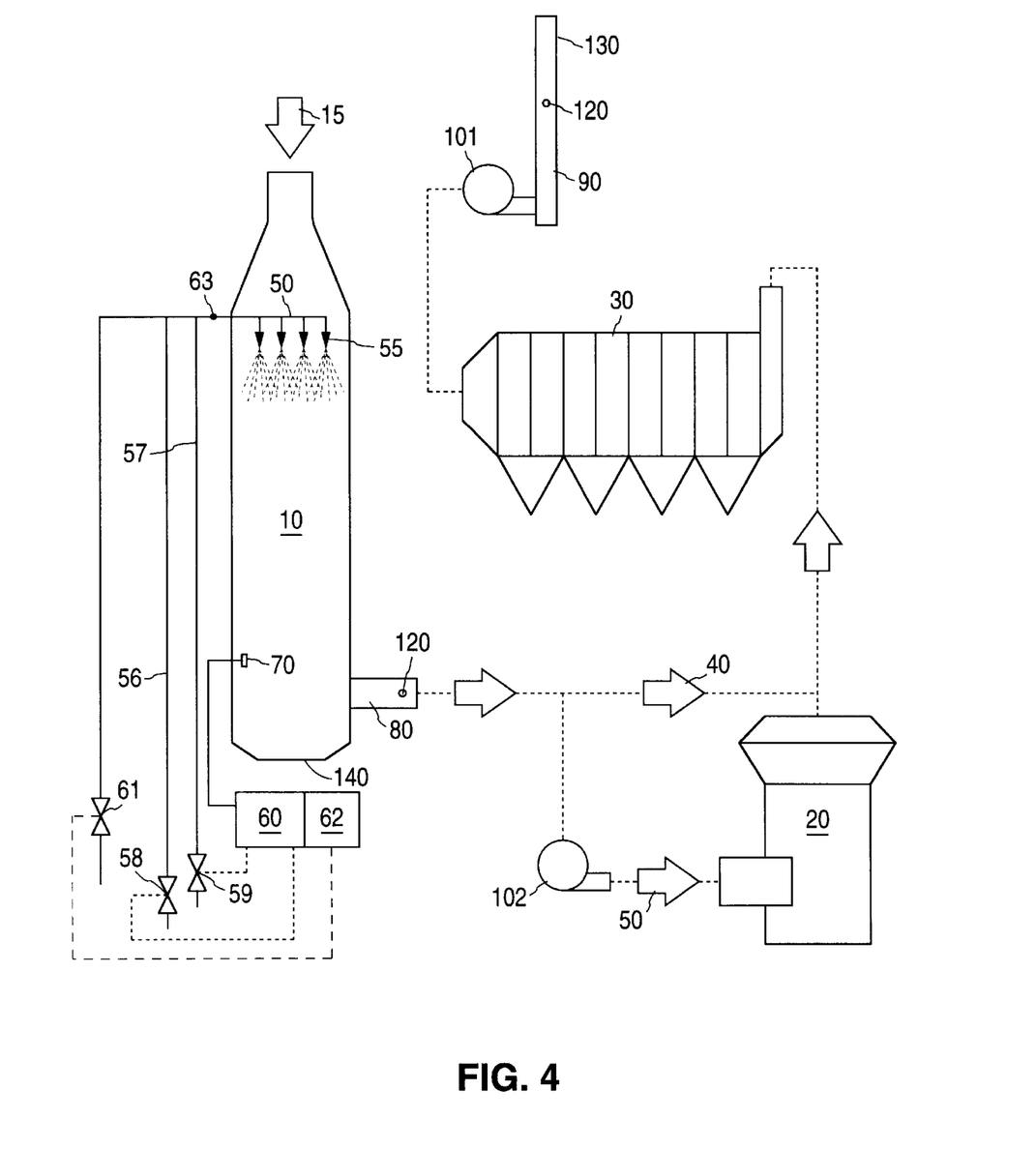
FIG. 4 is a process flow diagram of the present invention in which additional injectors permit an alkaline spray from the nozzles in the gas conditioning tower.

While the foregoing discussion is believed to be accurate and represents the inventors' best present understanding of their invention, the inventive techniques and apparatus described herein have been empirically demonstrated and do not depend on the accuracy of the inventors' theoretical model. As shown in FIG. 4, the present invention may be used in connection with the pollution control system of FIG. 2 further comprising an additional chemical injector 61 and a controller 62. Controller 62 preferably receives data on the spray characteristics from logic and control system 60. Controller 62 adjusts the rate that alkaline materials are injected into the cooling spray in GCT 10. As previously described in connection with FIG. 2, in the present invention the spray from the nozzles 55 is adjusted by logic and control system 60 to achieve the desired cooling function (e.g., reducing the gas temperature from about 400° C. to about 250° C. for the mill-on condition). The mean diameter of the spray droplets is typically selected to have a diameter of 120 to 150 microns such that the droplets completely evaporate only a comparatively short distance prior to the exit of the GCT 10, which increases their evaporative lifetime. The evaporative lifetime is thus slightly less than the gas transit time through the GCT.

According to the present invention the cooling spray of a GCT is modified to efficiently scrub acidic forming gases adding comparatively small amounts of inexpensive scrubbing agents that are compatible with cement plant operations. Modern two-fluid nozzles, such as the MICROMIST™ nozzle, are capable of substantial control of median droplet size and with a narrow distribution in droplet size (by adjusting the compressed air pressure). The mean droplet diameter is preferably less than about 200 microns. The use of such a two-fluid nozzle makes an efficient scrubbing process feasible because: 1) the initial surface-to-volume of the droplets is large such that the adsorption of gases is rapid; 2) the range of droplet sizes is narrow so that the droplets contain substantially the same quantity of scrubbing chemical, which facilitates uniform chemical reaction dynamics in the droplets; and 3) each droplet will have a similar evaporative lifetime (typically 1–5 seconds), since the median droplet size is selected such that the droplets evaporate proximate to the exit of the GCT.

In the present invention, the mean diameter of the spray droplets is preferably controlled using a modern two-fluid nozzle that is capable of producing a statistically narrow distribution of spray droplet diameters centered around a selectable mean value. A narrow distribution of droplet diameters may increase the potential efficiency of the scrubbing process. In contrast, if a single-fluid nozzle was used, the droplets would have a relatively large size distribution. This may decrease the ability of the droplets to effectively absorb enough acidic gases during their evaporative lifetime to attain a high collection efficiency. For example, droplets with an extremely small initial diameter (e.g., less than 50 microns) would have an evaporative lifetime substantially smaller than the transit time. This reduces the time available for the droplet to adsorb gases and form salts. Conversely, droplets with an extremely large initial diameter (e.g., greater than 250 microns) have a comparatively small surface-to-volume ratio, which is undesirable in terms of gas adsorption and absorption. Thus, preferably a two-fluid nozzle is used that produces a spray with a narrow statistical distribution of drop diameters centered around a selectable mean diameter less than about 200 microns.

According to the present invention, alkaline chemicals are used to scrub acidic forming gases, resulting in the formation of thermally stable salts such that sulfur dioxide, sulfur trioxide, and hydrogen chloride are captured before they react with ammonia. Thus chemical injector 61 injects an alkaline chemical into the spray liquid. However, unless the spray has a sufficiently high pH, other reactions, such as those previously described, may also occur in an alkaline spray. In particular, ammonia gas may also be absorbed by an alkaline droplet that contains some acid from acidic forming gases. This may result in the formation of ammonium sulfate and ammonium chloride in addition to thermally stable salts. The absorption of ammonia gas in the droplets may reduce the efficiency of the droplets at converting acidic forming gases into thermally stable salts such that the concentrations of sulfur dioxide, sulfur trioxide, and hydrogen chloride are not substantially reduced. Also, the absorption of ammonia into the spray droplets may prevent the recirculating load from being significantly reduced. Ammonium sulfate created in a spray droplet decomposes at 235° C., which is less than typical GCT outlet temperatures in the mill-on state. Consequently, any ammonium sulfate generated in the spray droplet would decompose such that its ammonia and sulfur trioxide would enter the feed meal. Additionally, even if the GCT outlet temperature was less than the decomposition temperature, ammonium sulfate particulates could be condensed onto or formed in the meal of the feed mill, which would also be undesirable. Similarly, ammonium chloride generated in spray droplets may exit the outlet 80 and potentially enter the feed meal.

The inventors have determined that an alkaline spray should have a sufficiently high pH in order to selectively absorb acidic forming gases while letting ammonia pass through the spray substantially non-absorbed. Consequently, ammonia gas will enter the raw feed meal, but with relatively low concentrations of other gases necessary to create a recirculating load of ammonia in the meal. This mode of operation permits a low concentration of ammonia gas to continuously exit from the stack 90 rather than accumulating a large recirculating load of ammonia on the feed meal exiting the feed mill 20. The solubility of ammonia in a spray droplet is strongly dependent upon the pH of the droplet. The solubility of ammonia decreases very sharply for a pH greater than ten. While ammonia is highly soluble in pure water (pH 7.0), it is only slightly soluble (e.g., less than 1% solubility relative to a pH of 7.0) in water droplets for a pH greater than 11. According to the preferred embodiment of the present invention, the selective absorption of acidic gases is accomplished by using spray droplets with a pH greater than about 11. However, a higher pH, such as a pH greater than about 12, facilitates the spray droplets absorbing a large load of acidic forming gases and rapidly forming salts during their short evaporative lifetime. Preferably, the pH of the spray droplets is greater than about 12. Still higher pH values may be desirable. It is also desirable that the pH remains high during the lifetime of the droplet. Depending upon the concentration of acidic forming gases in the pollutant stream, the pH of the droplet may substantially decrease as the droplet absorbs acidic forming gases in the GCT. Thus, in some cases it may be preferable to increase the pH to a value of 12.4 (the solubility limit for alkaline solutions comprised of hydrated lime) such that the pH of the droplet remains high throughout the lifetime of a spray droplet.

As previously discussed, it is believed that ammonium sulfate accumulates in the meal because of the reaction of sulfur dioxide on the meal surface with ammonia. If sulfur dioxide and sulfuric acid vapor are selectively scrubbed by the droplets, ammonia sulfate will tend not to accumulate in the meal. Similarly, if hydrogen chloride is selectively scrubbed by the droplets, the chemical reaction which produces ammonium chloride will be interrupted. Thus, increasing the pH of the spray prevents the formation of a large recirculating load of ammonia. Also, by increasing the pH of the spray, the concentrations of other chemicals required to form plumes (e.g., sulfur dioxide, sulfur trioxide, and hydrogen chloride) are also reduced.

In one embodiment of the present invention, water soluble alkaline chemicals are used as the scrubbing chemical. Injector 61 injects a controlled quantity of alkaline chemicals into the spray in response to controller 62. A wide variety of alkaline chemicals, such as potassium hydroxide or sodium hydroxide, form thermally stable salts with acidic gases. The internal temperature of a water droplet in which the salts form will remain at the wet bulb temperature of the liquid (approximately 60° C.) until the droplet completely evaporates proximate to exit 80. While the salts are initially dissolved in the droplets when they are formed, they become solid particles when the droplet evaporates. The salts will thus form solid particles proximate to the outlet 80. Salts at the base of the GCT 10 will not decompose into their constitute chemicals as long as the salts are thermally stable at temperatures of less than 250° C. The thermally stable salts formed in the GCT will tend to collect in the bottom 130 of the GCT (from which they may be periodically or continually removed), although some of the salts may be carried into the feed mill or the ESP.

Sodium hydroxide and potassium hydroxide are suitable water soluble alkaline chemicals that form thermally stable salts with acidic forming gases. For example, sodium hydroxide in spray droplets reacts with sulfurous acid and sulfuric acid formed from absorbed sulfur dioxide and sulfur trioxide to produce sodium sulfate according to the reaction: $H_2SO_4(aq)+2NaOH(aq)\rightarrow Na_2SO_4(aq)+2H_2O(l)$. Since sodium sulfate is thermally stable at temperatures greater than 882° C., a sodium hydroxide spray will bind up sulfur as thermally stable salts, reducing sulfur dioxide and sulfur trioxide concentrations on the meal. Similarly, sodium hydroxide may react with hydrogen chloride according to reaction: $HCl(aq)+NaOH(aq)\rightarrow NaCl(aq)+H_2O(l)$. Sodium chloride is a thermally stable salt at temperatures greater than 1413° C. such that a sodium hydroxide spray will bind up chlorine, thus preventing the formation of a recirculating load of ammonium chloride in the pollution control system.

Potassium hydroxide similarly reacts with acidic forming gases to form thermally stable salts. For example, potassium hydroxide reacts with sulfuric acid in spray droplets according to produce potassium sulfate according to the expression: $H_2SO_4(aq)+2KOH(aq)\rightarrow K_2SO_4(aq)+2H_2O(l)$. Potassium sulfate is a thermally stable salt at temperatures greater than 1689° C. such that a potassium hydroxide spray will reduce sulfur dioxide and sulfur trioxide concentrations on the meal. Similarly, potassium hydroxide may react with hydrogen chloride according to reaction: $HCl(aq)+KOH(aq)\rightarrow KCl(aq)+H_2O(l)$. Potassium chloride is a thermally stable salt at temperatures greater than 1500° C. such that a potassium hydroxide spray will bind up chlorine, thus preventing the formation of a recirculating load of ammonium chloride in the pollution control system.

Sodium hydroxide and potassium hydroxide are relatively inexpensive and highly soluble with water. However, as with other strongly alkaline solutions, exposure to air should be limited by measures to prevent reactions with carbon dioxide, such as separating the solution from air with inert gaseous nitrogen. For example, sealed or nitrogen purge storage tanks may be used to maintain the chemical activity of the solution.

Other basic solutions may also be used as the scrubbing agent, such as rare earth alkaline materials. In particular, slurries of hydrated lime (calcium hydroxide) are also effective to bind up sulfur and chlorine. Hydrated lime may react with sulfuric acid in a droplet to bind up sulfur in the form of a calcium sulfate salt according to the reaction: $Ca(OH)_2+H_2SO_4\rightarrow CaSO_4(s)+2H_2O(l)$. Calcium sulfate is thermally stable at temperatures greater than 1193° C. Similarly, hydrated lime may react with hydrochloric acid in a droplet to bind up chlorine as a calcium chloride salt according to the reaction: $Ca(OH)_2+2HCl(aq)\rightarrow CaCl_2(aq)+2H_2O$. Calcium chloride is thermally stable at temperatures greater than 1600° C.

Sources of fine particles of dry hydrated lime are commercially available, such as those produced according to the method of U.S. Pat. No. 5,233,239. Alternately, instead of purchasing fine particles of dry hydrated lime to make a lime slurry, an apparatus may be used to form a chemically reactive calcium hydroxide slurry in situ. If a lime slurry is used the spray injection nozzles are preferably designed to be abrasion resistant and resistant to plugging. Preferably, the lime slurry is comprised of small diameter particles, such as calcium hydroxide particles with a diameter in the range of 1 to 25 microns, to enable the slurry particles to rapidly dissolve in the spray droplets. The preferred range of particles sizes will vary somewhat with the evaporative lifetime of the spray droplets. Preferably, the calcium hydroxide particles are less than 15 microns in diameter for typical GCT evaporative lifetimes of about 3 seconds.

The inventors have empirically demonstrated the efficacy of their approach to plume abatement in field tests. The Edmonton Inland Cement manufacturing facility located in Edmonton, Alberta Canada was used to test the method of the present invention. The plant was modified to permit the injection of a sodium hydroxide solution into the cooling spray of the GCT. No detached plume was observed in the mill-on state. The mill was then deliberately shut-down to simulate an unexpected change to the mill-off condition. An opaque plume then formed over the plant. In one experiment a 15% by weight sodium hydroxide solution was injected into the spray. The injection rate was adjusted to achieve a pH of spray droplets of 11.4 for a spray flow rate of approximately 30 cubic meters per hour. The detached plume was suppressed shortly after sodium hydroxide injection began. The visible plume reappeared once the injection of the NaOH solution was terminated. Dust collected from the base of the conditioning tower was darker and lumpier than usual, which the inventors attribute to the formation of sodium sulfate salts. In addition to their successful demonstration of the suppression of detached plumes using sodium hydroxide, the inventors have also demonstrated the suppression of detached plumes using an injected lime slurry.

Figure 5:
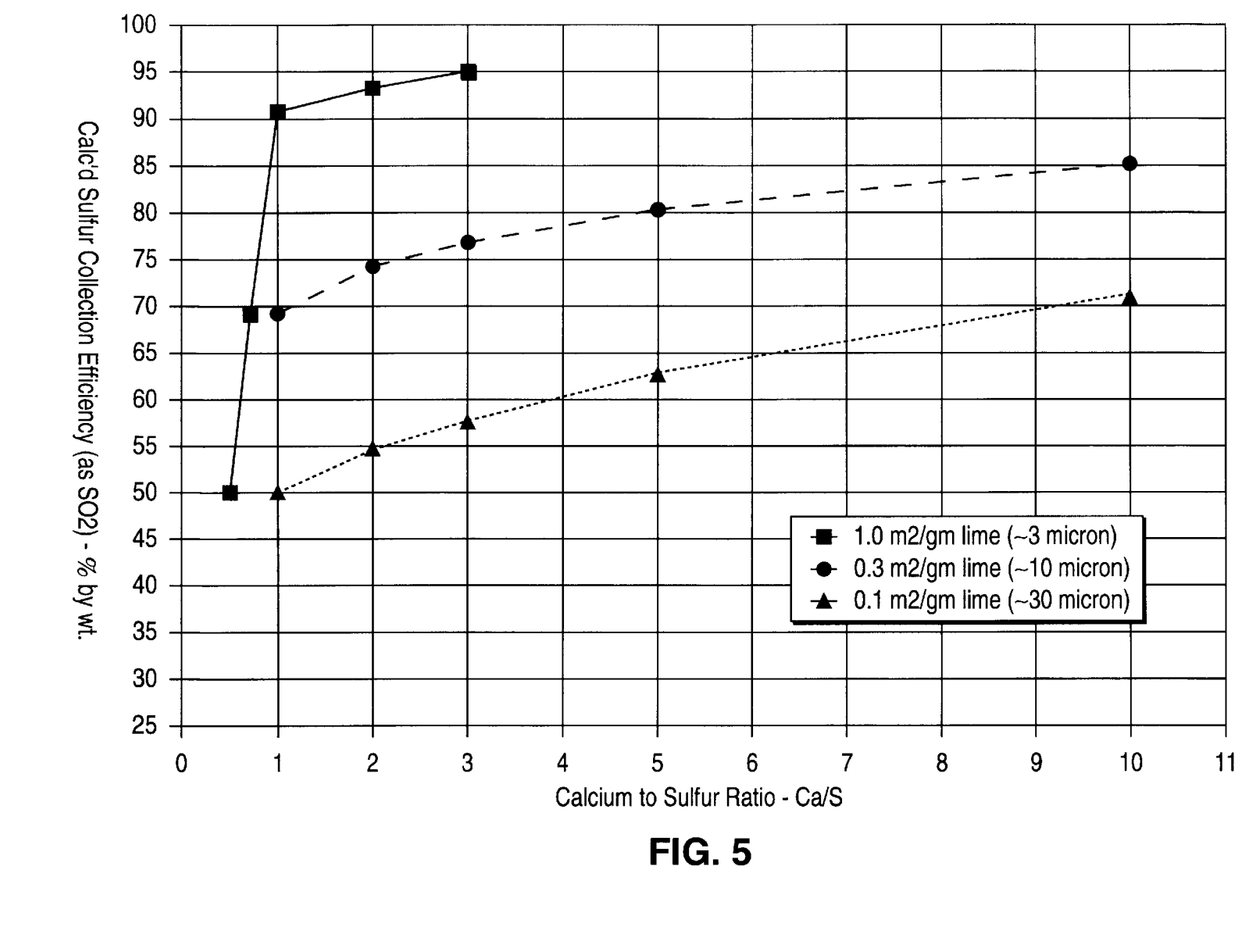
FIG. 5 is a plot of calculated sulfur collection efficiency versus molar ratio of calcium to sulfur for a gas conditioning tower in which the spray droplets have a mean evaporative lifetime of approximately three seconds.

The inventors have also empirically investigated reductions in sulfur dioxide concentrations in a cement plant in which the cooling spray used in the GCT is composed of water and a hydrated lime slurry. FIG. 5 is a plot of sulfur dioxide collection efficiency versus the molar ratio of calcium to sulfur. The experimental conditions corresponded to 257,800 kg/hr of hot gases with 56 kg/hr of sulfur. The input temperature of the gas was 375° C. The spray characteristics were adjusted to achieve an output temperature 150° C. and an evaporative lifetime of approximately 3 seconds. As shown in FIG. 5, a sulfur dioxide collection efficiency of 90% was achieved for a slurry comprised of 3 micron diameter lime particles. It was determined that by spraying an alkaline solution in the GCT collection efficiencies of sulfur dioxide between 30% to 95% can be achieve depending upon the pH of the alkaline solution, and other factors, such as the evaporative lifetime of the spray droplets. Similar collection efficiencies are possible for other acidic forming gases, such as hydrogen chloride. No experimental calculations were conducted for sodium hydroxide or potassium hydroxide. However, it is generally known by those skilled in the art of chemistry and chemical engineering that sodium hydroxide and potassium hydroxide are substantially more reactive than calcium hydroxide. Consequently, sulfur dioxide efficiencies in excess of 95% can be expected for sodium hydroxide and potassium hydroxide.

There are several different ways that the formation of detached plumes are suppressed using the teachings of the present invention. One important variable in deciding how much alkaline material to inject is related to the spray characteristics (droplet size and total quantity of liquid sprayed) which is also a function of operational state (mill-on or mill-off). A second important variable is that the rate at which salts are formed in a droplet is dependent upon the pH of a droplet. Preferably, the pH should be selected such that salts are formed at a rapid rate in the spray and such that the droplets are substantially insoluble to ammonia. The pH may be calculated from the quantity of alkaline material injected into the spray or measured with a pH meter 63 prior to nozzles 55. A third variable is that the severity of the recirculating load is a function of the operational history of the cement plant. In particular, the severity of the recirculating load will depend upon the time between mill shut-downs, the chemical composition of the raw feed, and other factors.

As previously discussed, detached plumes are an intermittent problem. The simplest abatement method is to increase the injection rate of the alkaline material in response to the formation of a visible detached plume observed by human observers or by opacity sensors 130 added proximate to the discharge of stack 90. However, in some cases it may be desirable to take prophylactic steps to prevent the formation of detached plumes. For example, it may be desirable to increase the injection rate of the alkaline material during those environmental conditions (e.g., low temperature, high humidity, and low wind speed) during which a detached plume is most likely to form in the atmosphere. It may also be desirable to measure the concentrations of plume forming gases using chemical sensors 120 at various locations in the plant. For example, sulfur dioxide sensors are commercially available. Techniques to periodically sample portions of gases for laboratory analysis are also well known. Also, modern cement plants have dust extractors 140, such as at the base of GCT 10, which continually extract dust at key locations. The extracted dust may be periodically analyzed to determine changes in chemical composition of the dust associated with a large recirculating load.

In some applications, it may be desirable to continuously inject alkaline materials in the mill-on state to prevent a buildup of a large recirculating load of ammonia or to significantly reduce the concentration of plume-forming gases from the stacks. For example, the steady-state injection rate could be experimentally selected to achieve a significant collection of acidic forming gases (e.g., such as a 10% collection of sulfur dioxide and sulfur trioxide in the GCT).

In other applications, it may be desirable to periodically purge the recirculating load by injecting a comparatively high quantity of alkaline material for a relatively short period in the mill-on state. The injection rate of alkaline materials in the mill-on state could be increased to achieve a substantial reduction in acidic forming gases, which would permit a recirculating load of ammonia to be rapidly bled from the pollution control system. For example, the system might be purged if analysis of stack emissions indicated a sudden rise in ammonia emissions associated with the recirculating load reaching its saturation limit. Alternatively, the system might be purged of its recirculating load if analysis of the chemical composition of extracted dust indicated that a large recirculating load of ammonia had developed.

In still other applications, it may be desirable to increase the quantity of alkaline material when operating conditions correlated with the onset of a detached plume (e.g., increased levels of sulfur dioxide and ammonia along with unfavorable weather conditions) arise. For example, the injection rate could be increased when a sensor 120 signaled a substantial rise in sulfur dioxide concentration. Similarly, the injection rate could be automatically increased in the mill-off state as a prophylactic measure against the formation of a plume. Moreover, local weather conditions may also be one of the factors correlated with the onset of the formation of a detached plume. It may, for example, be necessary to increase the quantity of alkaline material injected if local environmental conditions (e.g., wind speed, temperature, and humidity) make the formation of a detached plume likely.

In yet other applications, it may be desirable to increase the injection rate if opacity sensors or human observers detect the onset of a visible detached plume. For example, if weather conditions are unusually favorable for the formation of a detached plume, a plume may form even though emissions of ammonia and sulfur dioxide have not substantially risen. In such a situation, it is desirable to immediately increase the injection rate of alkaline material to suppress the further development of a detached plume.

While the present invention has been described with reference to the specific embodiments and elements disclosed, it is understood that other, equivalent embodiments of the invention are possible, and that the practice of the invention is not intended to be limited solely to those embodiments disclosed in this application.

What is claimed is:

1. A method of using a liquid spray to treat the effluent gases contaminated with acidic components and ammonia in an air pollution control system and inhibit the formation of plumes of visible particles comprised of ammonium salts in the atmosphere proximate the outlet of the pollution control system, the method comprising the steps of:

selecting the liquid flow rate of the liquid sprayed from a nozzle into the effluent gas flow;

selecting the mean diameter of the spray droplets sprayed into the effluent gas flow;

injecting a controlled flow rate of an alkaline scrubbing material into the spray liquid to be sprayed such that the pH of the spray droplets is selected to be greater than about 11 so that said acidic contaminants preferentially react with the spray droplets rather than the ammonia thereby reducing the formation of visible plumes of ammonium salts in the atmosphere, and injecting the alkaline spray liquid into the effluent gases so that the acidic components react with the alkaline scrubbing material.

2. The method of claim 1, wherein the flow rate of the alkaline scrubbing material is selected such that the pH of the spray droplet is greater than about 12.

3. The method of claim 2, wherein the alkaline scrubbing material comprises sodium hydroxide.

4. The method of claim 2, wherein the alkaline scrubbing material comprises potassium hydroxide.

5. The method of claim 2, wherein the alkaline scrubbing material is a slurry comprised of particles of an alkaline earth material.

6. The method of claim 5, wherein the mean diameter of the spray droplets is less than about 200 microns.

7. A method of using a liquid cooling spray to treat the effluent gases contaminated with acidic components and ammonia in an air pollution control system and inhibit the formation of plumes of visible particles comprised of ammonium salts in the atmosphere proximate the outlet of the pollution control system, the method comprising the steps of:

selecting a liquid flow rate to produce a spray comprised of a sufficient quantity of liquid to provide the required cooling when all of the liquid is evaporated;

selecting a mean-diameter of the spray droplets;

injecting a controlled flow rate of an alkaline scrubbing material into the cooling liquid to be sprayed so that the pH of the spray droplets is greater than about 11 so that said acidic contaminants preferentially react with the spray droplets rather than the ammonia thereby reducing the formation of visible plumes of ammonium salts in the atmosphere, and injecting the alkaline spray liquid into the effluent gases so that the acidic components react with the alkaline scrubbing material.

8. The method of claim 7, wherein the mean droplet diameter is selected to be less than about 200 microns.

9. The method of claim 8, wherein the flow rate of the alkaline scrubbing material is selected to achieve a pH greater than about 12.

10. The method of claim 9, wherein the alkaline scrubbing material comprises sodium hydroxide.

11. The method of claim 9 wherein the alkaline scrubbing material comprises potassium hydroxide.

12. The method of claim 9, wherein the alkaline scrubbing material is a slurry comprised of particles of an alkaline earth material.

13. The method of claim 12, wherein the alkaline scrubbing material is a hydrated lime slurry introduced into the spray at a rate selected so that the concentration of dissolved calcium hydroxide in the spray droplets reaches the solubility limit.

14. A method of using a liquid cooling spray to treat the effluent gases contaminated with acidic components and ammonia in an evaporative gas cooling tower of a cement plant and inhibit the formation of plumes of visible particles comprised of ammonium salts proximate the outlet of the pollution control system, the method comprising the steps of:

selecting a liquid flow rate of the cooling liquid to produce a spray comprised of a sufficient quantity of liquid to provide the required cooling for the operational state of the pollution control system;

selecting a mean spray droplet size such that the mean evaporative lifetime of the spray droplets is less than the gas transit time through the cooling tower;

selecting a flow rate of an alkaline scrubbing material injected into the cooling liquid to be sprayed so that the pH of the spray droplets is greater than about 11 so that said acidic contaminants preferentially react with the spray droplets rather than the ammonia thereby reducing the formation of visible plumes of ammonium salts in the atmosphere, and injecting the alkaline spray liquid into the effluent gases so that the acidic components react with the alkaline scrubbing material.

15. The method of claim 14, wherein the flow rate of the alkaline scrubbing material is selected to increase the pH of the spray to greater than 12 if a detached plume occurs.

16. The method of claim 14, wherein the flow rate of the alkaline scrubbing material is selected to increase the pH of the spray to greater than 12 if the concentration of gases correlated with the onset of detached plumes substantially increases.

17. The method of claim 14, wherein the flow rate of the alkaline scrubbing material is selected to continuously maintain the pH of the liquid spray at a pH greater than about 12.

18. The method of claim 14, wherein the alkaline scrubbing material comprises a hydrated lime slurry.

* * * * *